Dec. 24, 1957   O. FREE   2,817,744
HOT PLATE FOR FOOD
Filed May 13, 1957   2 Sheets-Sheet 1
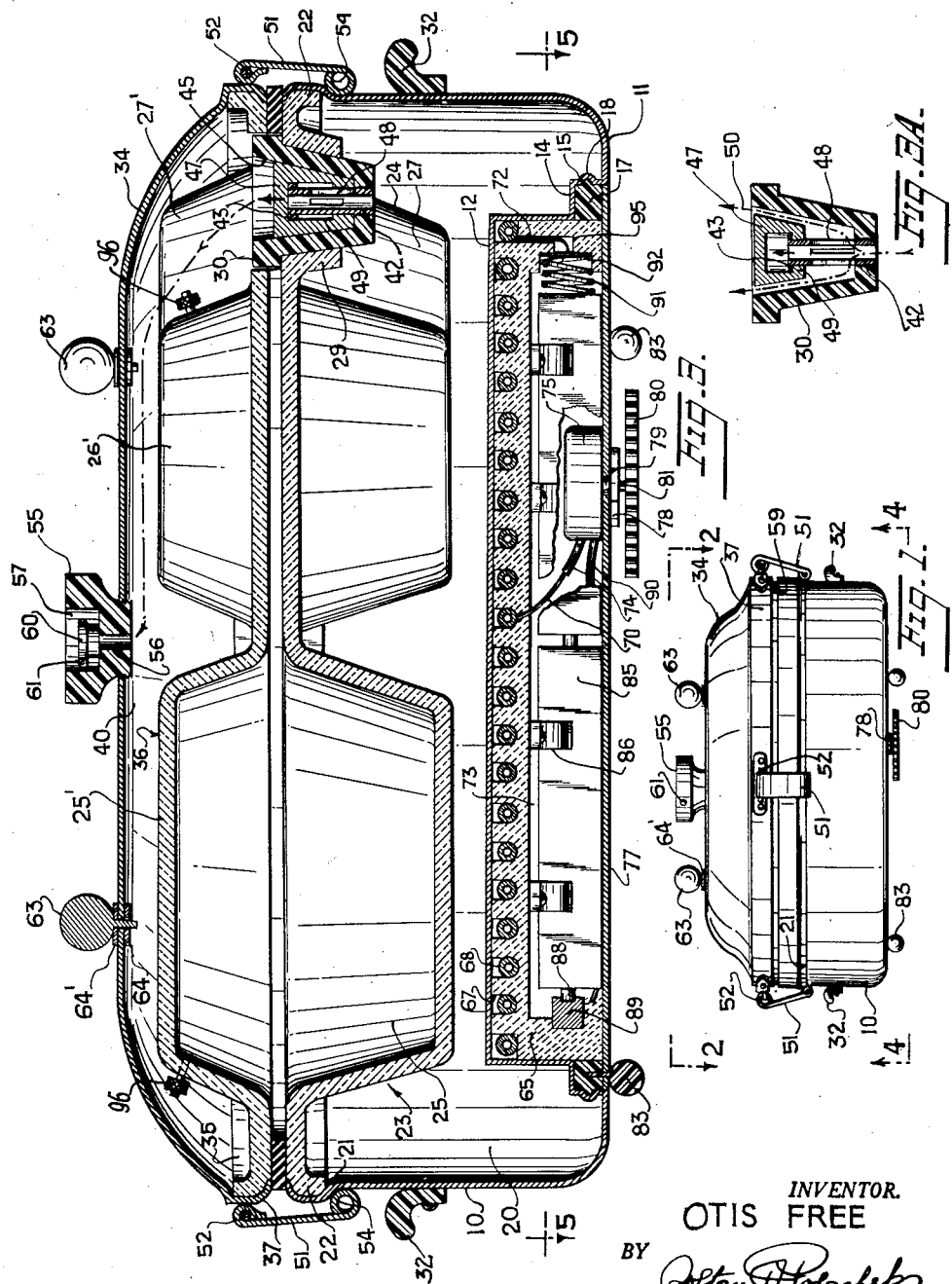
INVENTOR.
OTIS FREE
BY
ATTORNEY Dec. 24, 1957

O. FREE 2,817,744

HOT PLATE FOR FOOD

Filed May 13, 1957

INVENTOR.
OTIS FREE
BY
*Zoltan H. Polachek*
ATTORNEY

United States Patent Office 2,817,744
Patented Dec. 24, 1957

2,817,744

HOT PLATE FOR FOOD

Otis Free, Jersey City, N. J.

Application May 13, 1957, Serial No. 658,723

17 Claims. (Cl. 219—44)

This invention relates to new and useful improvements in a chafing device and particularly concerns a covered dish or pan provided with self-heating means in the form of an electrically energized heating unit and battery power supply.

According to the present invention there is provided a pan having a removable dish thereon formed with a plurality of recesses so that a variety of different foods can be placed in the several recesses. The dish is supported above the bottom of the pan to provide a compartment beneath the dish. The compartment may be filled with water. Disposed to project into the compartment is a cylindrical heating unit provided with batteries for energizing the unit. The assembly of heating unit and batteries is so arranged that it can be removed without opening the pan and moving the dish. A valve controlled plug is provided in a portion of the dish outside of the recesses for filling the compartment with water. The pan has a dished cover in which is disposed an inverted other dish arranged with recesses corresponding to the recesses in the dish in the pan. A space is provided above the dish in the cover so that heated water vapor can circulate in the cover to heat the top of the dish therein. The cover is so arranged that it can be inverted and used as another serving dish in addition to the dish in the pan. The cover is provided with a knob handle which has a vent and pressure release valve therein. Suitable legs are secured to the bottom of the pan to raise the bottom thereof above a supporting surface. A switch for operating the batteries and heating unit is accessible at the bottom of the pan. A plurality of knobs are provided on the top of the cover to serve as supports when the cover is inverted so that the dish therein is uppermost. Pivotally mounted latch elements are provided to removably secure the pan and cover with a sealing gasket disposed therebetween.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of the chafing dish or pan embodying the invention.

Fig. 3 is a vertical sectional view taken on lines 3—3 of Fig. 2.

Fig. 3A is a sectional view of the valved filler plug in one position of operation thereof.

Figure 2:
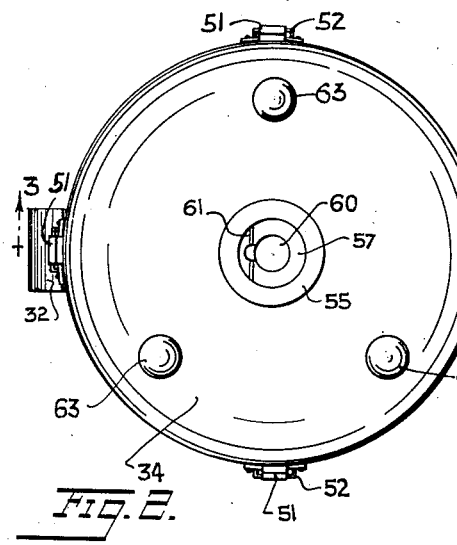
Fig. 2 is a top plan view of the device.
Figure 6:
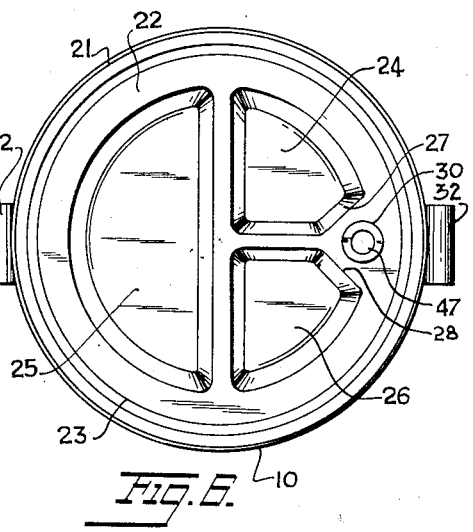
Fig. 6 is a top plan view of the lower dish and pan.
Figure 4:
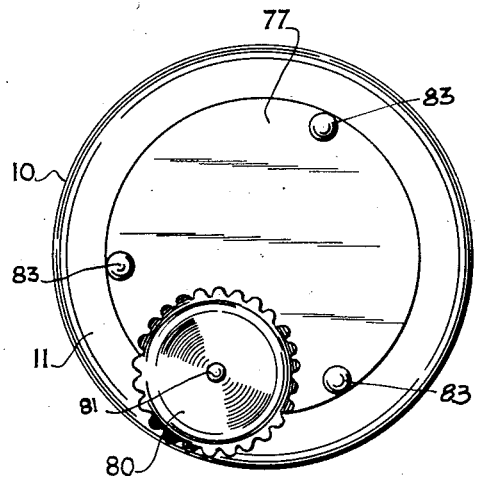
Fig. 4 is a bottom plan view of the device.

In Figs. 1–6 is shown a cylindrical pan 10 having its bottom recessed to form an annular rim 11 and inwardly extending wall 12 defining a cylindrical recess. The wall 12 of the recess is bent to form an annular shoulder 14 with a groove 15 in which is lodged a ring 17. The ring has a peripheral ridge 18 which fits into groove 15. The pan is preferably formed of a light metal such as aluminum, copper, stainless steel, etc. The ring 17 may be made of metal or plastic material. The wall 12 defines a cavity or compartment 20 with the cylindrical wall of pan 10.

A ledge 21 is formed at the top of the pan on which seats the annular rim 22 of dish 23. The dish has a generally semicircular recess 25 and two recesses 24 and 26 having the general form of quadrants of a circle. The corner walls 27, 28 of the recesses 24, 26 are inclined to each other to provide space for a tapered dependent nipple 29 in which fits a tapered plug 30. The dish may be formed of metal, porcelain, plastic or other heat-resistant material. A pair of heat-resistant handles 32 are secured to the side wall of the pan.

Cover 34 is a shallow dished member having an inwardly turned ledge 37 on which is engaged the annular rim 35 of an inverted dish 36. One recess 25' and two recesses 26' are formed in dish 36. These recesses overlie recesses 25 and 24, 26, respectively, in dish 23. The recesses 25' and 26' conform in outline to the recesses in dish 23 but may be made somewhat shallower, as shown in Fig. 3. Another compartment 40 is defined between the top of the inverted dish 36 and the inner wall of cover 34. Compartment 20 communicates with compartment 40 through a vent in plug 30.

Plug 30 has a flat bottom formed with a cylindrical hole or vent in which is threaded a short cylindrical tube 42. At the top of the tube is an annular flange 43. Plug 30 has a frusto-conical recess 45 in which is movably fitted a hollow frusto-conical valve element 47. This element has an inwardly turned annular flange 49 whose inner diameter is substantially equal to the outer diameter of tube 42. Tube 42 has a plurality of longitudinal slots 48 arranged in the periphery thereof. The slots are normally covered by the valve element when it is in the lower position shown in Fig. 3. When the water, which normally fills compartment 20, is heated, the pressure of water vapor or steam raises the valve element after a predetermined pressure is exceeded so that the valve element assumes the uppermost position shown in Fig. 3A. Then compartment 20 communicates with compartment 40 through slots 48, as shown by the dotted arrows 50.

Latch clip members 51 are pivotally secured to pintles 52 on cover 34. The latch members are metal spring clips or strips having ends 54 curved to engage under the ledge 21 at the top of the pan.

The cover is provided with a handle or knob 55 disposed on the center thereof. The knob has a vent 56 opening into a recess 57 in which is pivotally mounted a valve element 60. The element is a cylindrical weight which is raised on pintle 61 to open vent 56 when the pressure in compartment 40 becomes excessive. Normally the weight 60 is selected so that valve element 47 will be raised at a higher pressure than valve element 60.

A plurality of knobs 63 are distributed on the cover 34 and serve as leg supports when the cover is inverted so that the recesses in dish 36 are uppermost. Knobs 63 have threaded stems secured by nuts 64 and lock washers 64' to the cover.

The heating assembly which is disposed in the bottom of the pan is separated from compartment 20 by the thin heat conductive wall 12. Thus the heating assembly is physically outside the pan although wholly contained within its outer cylindrical body. In the cup-shaped wall 12 is a cup-shaped ceramic plate 65 formed of any suitably refractory, non-electrical conductive material. The circular cup-shaped plate has in its upper face a spiral groove 67 with side walls so formed that they securely retain the spirally arranged metal electrical heating coil 68. The coil is located in the bottom of the groove so that it is slightly spaced from the metal wall 12. Terminals 70 and 72 extend from the center and outer turns of coil 68. Center terminal 70 extends into the cavity 73 in plate 65 where it is connected to lead 74 of a switch 75. The switch is secured to a circular metal plate 77 by a locknut 78 threaded on a centrally disposed sleeve shaft 79 extending through plate 77. A serrated wheel 80 is mounted on the end of shaft 81 which extends through sleeve shaft 80 for actuating the switch. The wheel 80 is accessible at the bottom of the pan below rim 11, as shown best in Fig. 4. Knobs 83 are distributed around the rim of plate 65 and serve as supports or mounting feet to elevate the bottom of the pan and plate 77 above a flat support surface. Knobs 83 have threaded extending stem portions which pass through apertures in plate 77 and are threaded in ring 17. Thus the knobs 83 serve both as mounting feet and as means to secure the plate and heating unit to the pan 10.

Figure 5:
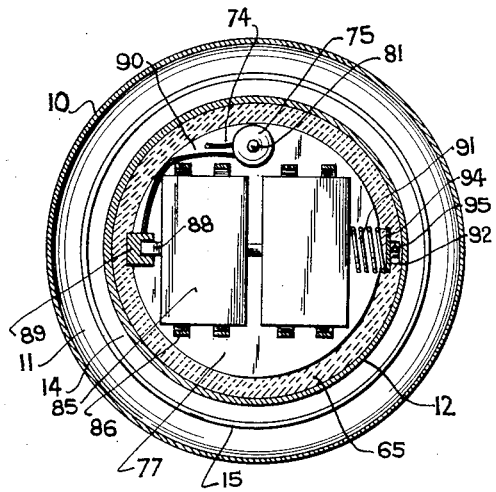
Fig. 5 is a sectional view taken on lines 5—5 of Fig. 3.

In cavity 73 may be disposed one or more flat batteries 85. The batteries are mounted on plate 77 by spring clips 86 secured to plate 65. The clips engage the sides of the batteries. The inner sides of the batteries should be slightly spaced from the inner wall of plate 77. The positive terminal pin 88 of one battery is engaged in a recess in a metal lug 89 secured to the vertical inner wall of plate 65. Lead 90 of switch 75 is connected to this lug as best shown in Fig. 5. A coil spring 91 is located in another recess 92 in the inner vertical wall of plate 65 diametrically opposite to lug 89. The spring extends out of the recess 92 and engages the bottom of the adjacent battery 85 to press pin 88 firmly into engagement with lug 89. Terminal 72 of the heating coil is connected to a small metal disk 94 located at the inner end of recess 92. Terminal 72 extends to recess 92 through a passage 95 in plate 65.

The body of switch 75 is conventionally arranged to open and close in turn the circuit between batteries 85 and heating coil 68 as the actuating wheel 80 is rotated in one direction or another. Two serially arranged batteries 85 are shown in Figs. 3 and 5 but any desired number may be used.

The compartment 20 in the device will normally be partly filled with water by removal of plug 30. Any appropriate foodstuffs and comestibles will be placed in recesses 24, 25, 26. Plug 30 will be replaced and cover 34 will be secured over the pan 10 by means of latches 51. When the switch 75 is actuated the water in the compartment 20 is heated. At a first predetermined low pressure, valve element 60 is raised so that heated water vapor and air can circulate in chamber 40. Thus the dishes 23 and 36 are heated above and below by hot water and steam in compartment 20 and hot air and water vapors in compartment 40. If the pressure in compartment 40 rises to too great an extent the valve element 60 is raised to vent the chamber 40. The coil 68 may be designed so that the food in the dish 23 is only moderately warmed or the heat supplied may be sufficient to cook the food. The batteries when exhausted are conveniently replaced by unscrewing knobs 83 to release plate 77 and the entire assembly of heating elements. Plate 77 is not attached to the cup-shaped plate 65 so that plate 77 can be lifted off to expose the batteries 85. The annular gasket 59 which is disposed between rims 22 and 35 of the lower and upper dishes insures an effective seal between the pan and cover for the compartments defined by the facing recesses in the dishes. Plate 65 can be held frictionally by ring 17 within the recess defined by wall 12 if desired.

Suitable adjustable pressure release valves 96 are also provided along the walls of the dishes 36 to regulate the vapor produced by cooking the food in the dishes 23 and 36.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A self-warming pan, comprising a hollow lower casing section, a dish fixedly mounted in said casing section and having at least one recessed portion adapted to contain food, said portion extending down into said casing section, said portion being smaller than the interior of the casing section and leaving a space for a quantity of water in the bottom thereof, said dish having a fill opening communicating with said space, a hollow upper casing section superimposed on said lower casing section, another dish mounted within said upper casing section for extending over and closing the open top of said recessed portion, means releasably retaining said upper casing section on said lower casing section, a valved plug disposed in said opening in the dish, and a battery energized heating element disposed at the bottom of the lower casing section to heat the water therein.

2. A self-warming chafing device, comprising a hollow pan, a dish fixedly mounted on said pan and having at least one recessed portion adapted to contain food, said portion projecting down into said pan and being smaller than the interior of said pan to leave a space for a quantity of water, said dish having a downwardly extending nipple defining a fill opening communicating with said space, a vented valved plug removably disposed in said nipple, a hollow cover superimposed on said pan, an inverted dish mounted within said cover for extending over and closing the open top of said recessed portion, means releasably retaining said cover on said pan, a knob handle mounted on the top of said cover, said knob having a vented recess opening into a compartment defined between said inverted dish and said cover, said compartment communicating with said space through said opening and said vented valved plug, and an electrically energized heating unit disposed at the bottom of said pan to heat the water therein.

3. A self-heating chafing device, comprising a hollow pan, a dish fixedly mounted on said pan and having at least one recessed portion adapted to contain food, said portion projecting down into the pan and leaving a space therein for a quantity of water, said dish having a fill opening communicating with said space, a vented valve plug disposed in the opening in the dish, a hollow cover superimposed on said pan, an inverted dish mounted within said cover for extending over and closing the open top of said recessed portion, means releasably retaining the cover on the pan, and a heating unit comprising an electrical heating coil and at least one battery connected to said coil, said heating unit being removably mounted at the bottom of said pan to heat the water therein.

4. A self-warming chafing device, comprising a hollow pan, a dish fixedly mounted on said pan and having at least one recessed portion adapted to contain food, said portion projecting down into said pan and being smaller than the interior of said pan to leave a space for a quantity of water, said dish having a fill opening communicating with said space, a vented plug removably disposed in said opening, a hollow cover superimposed on said pan, an inverted dish mounted within said cover for extending over and closing the open top of said recessed portion, means releasably retaining said cover on said pan, a knob handle mounted on the top of said cover, said knob having a vented recess opening into a compartment defined between said inverted dish and said cover, said compartment communicating with said space through said vented plug, and an electrically energized heating unit disposed at the bottom of said pan to heat the water therein.

5. A self-heating chafing device, comprising a hollow pan, a dish fixedly mounted on said pan and having at least one recessed portion adopted to contain food, said portion projecting down into the pan and leaving a space therein for a quantity of water, said dish having a fill opening communicating with said space, a valved plug disposed in the opening in the dish, a hollow cover superimposed on said pan, an inverted dish mounted within said cover for extending over and closing the open top of said recessed portion, and a heating unit comprising an electrical heating coil and at least one battery connected to said coil, said heating unit being mounted at the bottom of said pan to heat the water therein.

6. A self-warming chafing device, comprising a hollow pan, a dish fixedly mounted on said pan and having at least one recessed portion adapted to contain food, said portion projecting down into said pan and being smaller than the interior of said pan to leave a space for a quantity of water, said dish having a first opening communicating with said space, a vented plug removably disposed in said opening, a hollow cover superimposed on said pan, an inverted dish mounted within said cover for extending over and closing the open top of said recessed portion, said cover having a second opening into a compartment defined between said inverted dish and said cover, said compartment communicating with said space through said first opening and an electrically energized heating unit disposed at the bottom of said pan to heat the water therein.

7. A self-heating chafing device, comprising a hollow pan, a dish fixedly mounted on said pan and having at least one recessed portion adapted to contain food, said portion projecting down into the pan and leaving a space therein for a quantity of water, said dish having a fill opening communicating with said space, a hollow cover superimposed on said pan, an inverted dish mounted within said cover for extending over and closing the open top of said recessed portion, and a heating unit comprising an electrical heating coil and at least one battery connected to said coil, said heating unit being mounted at the bottom of said pan to heat the water therein.

8. A self-warming pan, comprising a hollow lower casing section, a first dish fixedly mounted in said casing section and having at least one recessed portion adapted to contain food, said portion extending down into said casing section, said portion being smaller than the interior of the casing section and leaving a space for a quantity of water in the bottom thereof, said dish having a fill opening communicating with said space, a hollow upper casing section superimposed on said lower casing section, another dish mounted within said upper casing section for extending over and closing the open top of said recessed portion, and a battery energized heating element disposed at the bottom of the lower casing section to heat the water therein.

9. A self-warming pan, comprising a hollow lower casing section, a dish fixedly mounted in said casing section and having at least one recessed portion adapted to contain food, said portion extending down into said casing section, said portion being smaller than the interior of the casing section and leaving a space for a quantity of water in the bottom thereof, a hollow upper casing section superimposed on said lower casing section, another dish mounted within said upper casing section for extending over and closing the open top of said recessed portion, and a battery energized heating element disposed at the bottom of the lower casing section to heat the water therein.

10. A self-heating chafing device, comprising a hollow pan, a first dish fixedly mounted in said pan and having at least one recessed portion adapted to contain food, said portion projecting down into said pan, said portion being smaller than the interior of said pan and leaving a space for a quantity of water, said dish having a fill opening outside of said recess communicating with said space, a valved plug disposed in said opening, a hollow cover superimposed on said pan, an inverted dish mounted within said cover, said inverted dish having a recess shaped to extend over and close the open top of the recess in the first dish, means releasably retaining said cover on said pan, a flexible sealing ring disposed between the pan and cover, the bottom of said pan being formed with a cylindrical wall having a closed top and defining a centrally disposed cavity beneath the bottom of the pan, a cup-shaped refractory plate disposed in said cavity, a wire coil mounted in a spiral groove in said plate facing said closed top, a battery disposed in said cavity beneath said plate, a flat plate, a second ring secured in said wall at the bottom of said cavity, said flat plate being removably secured to said second ring, and a switch supported on the flat plate, said battery, switch and coil being in electrical circuit with each other, said switch having a portion accessible outside of the pan for actuating the switch and controlling said circuit.

11. A self-heating chafing device, comprising a hollow pan, a first dish fixedly mounted in said pan and having at least one recessed portion adapted to contain food, said portion projecting down into said pan, said portion being smaller than the interior of said pan and leaving a space for a quantity of water, said dish having a fill opening outside of said recess communicating with said space, a valved plug disposed in said opening, a hollow cover superimposed on said pan, an inverted dish mounted within said cover, said inverted dish having a recess shaped to extend over and close the open top of the recess in the first dish, means releasably retaining said cover on said pan, a flexible sealing ring disposed between the pan and cover, the bottom of said pan being formed with a cylindrical wall having a closed top and defining a centrally disposed cavity beneath the bottom of the pan and a battery energized heating unit disposed in said cavity.

12. A self-heating chafing device, comprising a hollow pan, a first dish fixedly mounted in said pan and having at least one recessed portion adapted to contain food, said portion projecting down into said pan, said portion being smaller than the interior of said pan and leaving a space for a quantity of water, said dish having a fill opening outside of said recess communicating with said space, a valved plug disposed in said opening, a hollow cover superimposed on said pan, an inverted dish mounted within said cover, said inverted dish having a recess shaped to extend over and close the open top of the recess in the first dish, means releasably retaining said cover on said pan, a flexible sealing ring disposed between the pan and cover, the bottom of said pan being formed with a cylindrical wall having a closed top and defining a centrally disposed cavity beneath the bottom of the pan, a cup-shaped refractory plate disposed in said cavity, a wire coil mounted in a spiral groove in said plate facing said closed top, and a battery disposed in said cavity beneath said plate, said battery and coil being in electrical circuit with each other.

13. A self-heating chafing device, comprising a hollow pan, a first dish fixedly mounted on said pan and having a plurality of recessed portions adapted to contain food, said portions projecting down into said pan and being smaller than the interior thereof to define a first compartment for water, said first dish having a fill opening communicating with said compartment, a hollow cover superimposed on said pan, an inverted second dish mounted within said cover and spaced therefrom to define another compartment, said second dish having recesses conforming in outline to the recesses in the first dish to close the open tops thereof, spring clip means releasably retaining the cover on said pan, said fill opening being located outside of the recesses in the first dish so that the first and second compartments communicate with each other through said opening in the first dish, a removable valved vented plug normally closing said fill opening, said plug having an enlarged head portion resting on the top face of said dish, said opening being formed as a nipple having a tapered form depending into said first compartment, a valved vented knob mounted on said cover and opening into said other compartment, a flexible gasket ring disposed between the pan and cover, a plurality of knobs disposed on said cover to define mounting feet when the cover is inverted, the bottom of said pan being formed with a cylindrical wall having a closed top defining a cavity beneath the bottom of the pan, a cup-shaped refractory plate disposed in said cavity, a wire coil mounted in a spiral groove in said plate and facing said closed top of the cylindrical wall, a battery disposed beneath said plate, a circular flat plate disposed flush with the bottom of the pan, another ring secured at the bottom of said cavity, a plurality of spaced knobs removably securing the flat plate to the other ring, a switch body mounted on the flat plate adjacent the battery, and an actuating member disposed outside the pan and operatively connected to the switch body, said coil having one terminal electrically connected to a terminal of the battery and another terminal electrically connected to a switch lead wire, said switch having another lead wire electrically connected to another terminal of the battery.

14. A self-heating chafing device, comprising a hollow pan, a first dish fixedly mounted on said pan and having a plurality of recessed portions adapted to contain food, said portions projecting down into said pan and being smaller than the interior thereof to define a first compartment for water, said first dish having a fill opening communicating with said compartment, a hollow cover superimposed on said pan, an inverted second dish mounted within said cover and spaced therefrom to define another compartment, said second dish having recesses conforming in outline to the recesses in the first dish to close the open tops thereof, spring clip means releasably retaining the cover on said pan, said fill opening being located outside of the recesses in the first dish so that the first and second compartments communicate with each other through said opening in the first dish, a removable valved vented plug normally closing said fill opening, said plug having an enlarged head portion resting on the top face of said dish, said opening being formed as a nipple having a tapered form depending into said first compartment, a valved vented knob mounted on said cover and opening into said other compartment, a flexible gasket ring disposed between the pan and cover, a plurality of knobs disposed on said cover to define mounting feet when the cover is inverted, the bottom of said pan being formed with a cylindrical wall having a closed top defining a cavity beneath the bottom of the pan, a cup-shaped refractory plate disposed in said cavity, a wire coil mounted in a spiral groove in said plate and facing said closed top of the cylindrical wall, a battery disposed beneath said plate, a circular flat plate disposed flush with the bottom of the pan, another ring secured at the bottom of said cavity, a plurality of spaced knobs removably securing the flat plate to the other ring, a switch body mounted on the flat plate adjacent the battery, and an actuating member disposed outside the pan and operatively connected to the switch body, said coil, switch body and battery being connected in an electrical series circuit with each other.

15. A self-heating chafing device, comprising a hollow pan, a first dish fixedly mounted on said pan and having a plurality of recessed portions adapted to contain food, said portions projecting down into said pan and being smaller than the interior thereof to define a first compartment for water, said first dish having a fill opening communicating with said compartment, a hollow cover superimposed on said pan, an inverted second dish mounted within said cover and spaced therefrom to define another compartment, said second dish having recesses conforming in outline to the recesses in the first dish to close the open tops thereof, said fill opening being located outside of the recesses in the first dish so that the first and second compartments communicate with each other through said opening in the first dish, a removable valved vented plug normally closing said fill opening, said plug having an enlarged head portion resting on the top face of said dish, said opening being formed as a nipple having a tapered form depending into said first compartment, a valved vented knob mounted on said cover and opening into said other compartment, a plurality of knobs disposed on said cover to define mounting feet when the cover is inverted, the bottom of said pan being formed with a cylindrical wall having a closed top defining a cavity beneath the bottom of the pan, a cup-shaped refractory plate disposed in said cavity, a wire coil mounted in a spiral groove in said plate and facing said closed top of the cylindrical wall, a battery disposed beneath said plate, a circular flat plate disposed flush with the bottom of the pan, a ring secured at the bottom of said cavity, a plurality of spaced knobs removably securing the flat plate to the other ring, a switch body mounted on the flat plate adjacent the battery, and an actuating member disposed outside the pan and operatively connected to the switch body, said coil, switch body and battery being connected in an electrical series circuit with each other.

16. A self-heating chafing device, comprising a hollow pan, a first dish fixedly mounted on said pan and having a plurality of recessed portions adapted to contain food, said portions projecting down into said pan and being smaller than the interior thereof to define a first compartment for water, said first dish having a fill opening communicating with said compartment, a hollow cover superimposed on said pan, an inverted second dish mounted within said cover and spaced therefrom to define another compartment, said second dish having recesses conforming in outline to the recesses in the first dish to close the open tops thereof, spring clip means releasably retaining the cover on said pan, said fill opening being located outside of the recesses in the first dish so that the first and second compartments communicate with each other through said opening in the first dish, a removable valved vented plug normally closing said fill opening, said plug having an enlarged head portion resting on the top face of said dish, a valved vented knob mounted on said cover and opening into said other compartment, a plurality of knobs disposed on said cover to define mounting feet when the cover is inverted, the bottom of said pan being formed with a cylindrical wall having a closed top defining a cavity beneath the bottom of the pan, a cup-shaped refractory plate disposed in said cavity, a wire coil mounted in a spiral groove in said plate and facing said closed top of the cylindrical wall, and means for supporting a battery beneath said plate.

17. A self-heating chafing device, comprising a hollow pan, a first dish fixedly mounted on said pan and having a plurality of recessed portions adapted to contain food, said portions projecting down into said pan and being smaller than the interior thereof to define a first compartment for water, said first dish having a fill opening communicating with said compartment, a hollow cover superimposed on said pan, an inverted second dish mounted within said cover and spaced therefrom to define another compartment, said second dish having recesses conforming in outline to the recesses in the first dish to close the open tops thereof, said fill opening being located outside of the recesses in the first dish so that the first and second compartments communicate with each other through said opening in the first dish, a removable valved vented plug normally closing said fill opening, said plug having an enlarged head portion resting on the top face of said dish, a vented knob mounted on said cover and opening into said other compartment, a plurality of knobs disposed on said cover to define mounting feet when the cover is inverted, the bottom of said pan being formed with a cylindrical wall having a closed top defining a cavity beneath the bottom of the pan, a cup-shaped refractory plate disposed in said cavity, a wire coil mounted in a spiral groove in said plate and facing said closed top of the cylindrical wall, means for supporting a battery beneath said plate, a circular flat plate disposed flush with the bottom of the pan, another ring secured at the bottom of said cavity, a plurality of spaced kobs removably securing the flat plate to the other ring, a switch body mounted on the flat plate adjacent the battery, and an actuating member disposed outside the pan and operatively connected to the switch body.

References Cited in the file of this patent

UNITED STATES PATENTS

| | | |
|---|---|---|
| 1,282,230 | Hoddenbach | Oct. 22, 1918 |
| 1,499,364 | Goodrick | July 1, 1924 |
| 2,235,911 | Wilcox | Mar. 25, 1941 |
| 2,357,634 | Crites | Sept. 5, 1944 |
| 2,545,733 | Hatfield | Mar. 20, 1951 |